(12) United States Patent
Hurst et al.

(10) Patent No.: US 7,898,141 B2
(45) Date of Patent: Mar. 1, 2011

(54) ELECTRIC DRIVE

(75) Inventors: Richard Hurst, Offenburg (DE);
Martin Heyder, Ottersweier (DE);
Matthias Koesters, Changsha/Xingsha (CN); Norbert Martin, Achem (DE)

(73) Assignee: Robert Bosch GmbH, Stuttgart (DE)

( * ) Notice: Subject to any disclaimer, the term of this patent is extended or adjusted under 35 U.S.C. 154(b) by 23 days.

(21) Appl. No.: 12/374,692

(22) PCT Filed: Dec. 7, 2007

(86) PCT No.: PCT/EP2007/063540
§ 371 (c)(1),
(2), (4) Date: Jan. 22, 2009

(87) PCT Pub. No.: WO2008/095564
PCT Pub. Date: Aug. 14, 2008

(65) Prior Publication Data
US 2009/0315420 A1    Dec. 24, 2009

(30) Foreign Application Priority Data
Feb. 5, 2007    (DE) .......................... 10 2007 005 572

(51) Int. Cl.
*H02K 13/00*    (2006.01)
(52) U.S. Cl. ...................................................... 310/239
(58) Field of Classification Search .................. 310/239, 310/240, 241, 242
See application file for complete search history.

(56) References Cited

U.S. PATENT DOCUMENTS

| 5,194,769 | A | 3/1993 | Ade et al. | |
| 6,555,943 | B2 * | 4/2003 | Walther et al. | 310/239 |
| 2002/0149283 | A1 * | 10/2002 | Hager et al. | 310/239 |

FOREIGN PATENT DOCUMENTS

| EP | 0554171 A1 | 8/1993 |
| EP | 05541717 A | 8/1993 |
| GB | 2044552 A | 10/1980 |
| WO | 2006021573 A1 | 3/2006 |

OTHER PUBLICATIONS

PCT/EP2007/063540 International Search Report, Apr. 4, 2008.
* cited by examiner Primary Examiner — Nguyen N Hanh
(74) Attorney, Agent, or Firm — Michael Best & Friedrich LLP

(57) ABSTRACT

An electric drive, in particular a wiper drive for vehicles, is proposed, with an electric driving motor in a motor housing (50), a brush holder (10) projecting into the motor housing (50), an anti-interference module (18) which is connected electrically and mechanically to the brush holder (10) and is intended for the electrical connection and interference protection of the motor, and with a gear mechanism (52) which is attached to the motor housing (50), at least partially accommodates the anti-interference module (18) and is designed in accordance with the predetermined position of the output shaft (53) with respect to the drive shaft (58). According to the invention, the diversity of components of the electric drive and therefore, in particular, the diversity of tools for producing the components are reduced by the anti-interference module (18) and the brush holder (10) being equipped with corresponding retaining means (40, 44) which permit the installation of a structurally identical anti-interference module (18) on the brush holder (10) in two installation positions rotated through 180°.

8 Claims, 4 Drawing Sheets

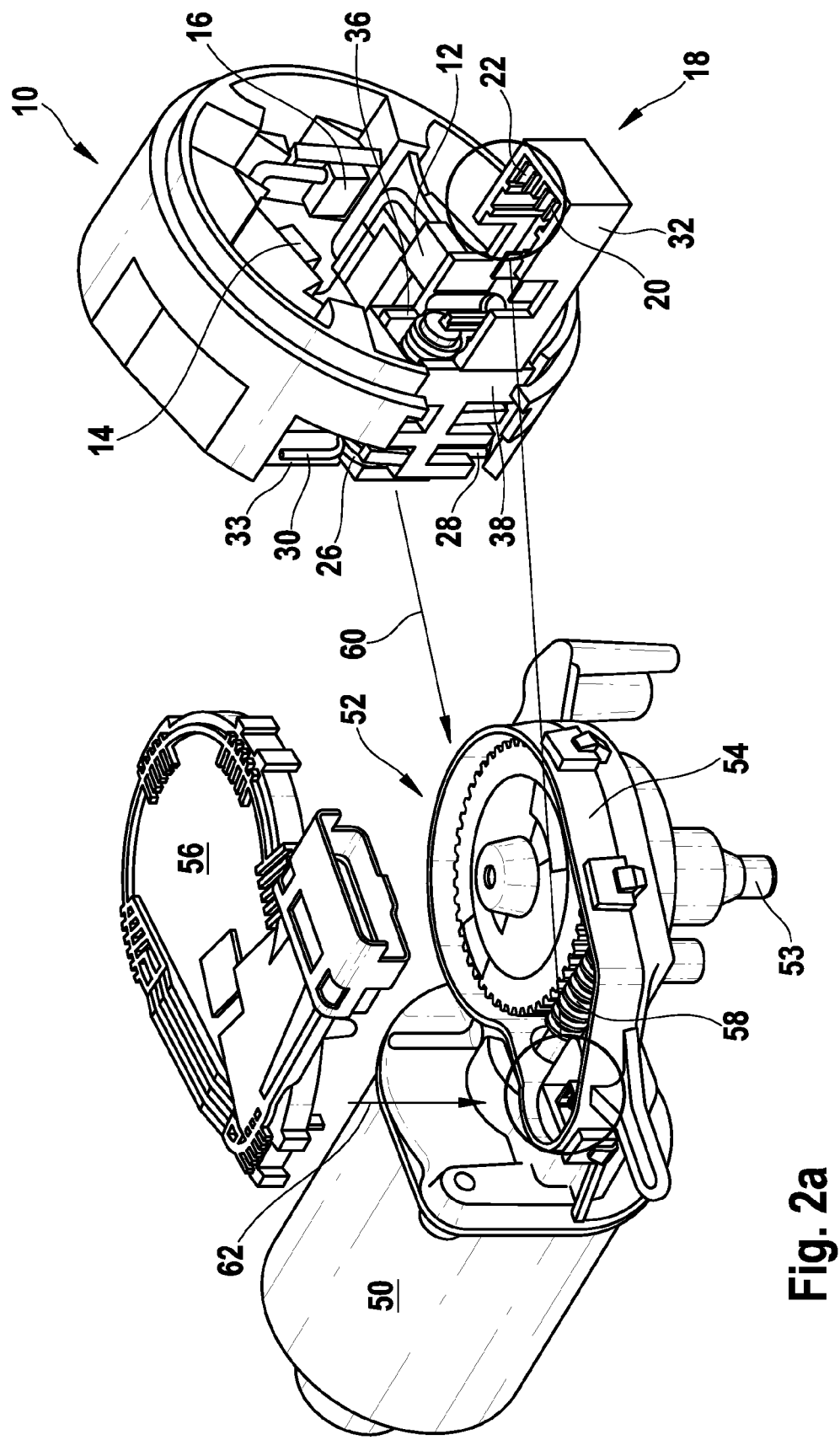

ELECTRIC DRIVE

BACKGROUND AND SUMMARY OF THE INVENTION

The invention is based on an electric as known, for example, from DE 39 30 144 A1. Said document discloses a small electric motor for driving windshield wipers in motor vehicles, which motor has an interference suppression module arranged in a pocket of the gear mechanism pot, said interference suppression module at the same time performing the function of an electrical connection part from the brushes of the electric motor to the external connections. In this case, the brush arrangement of the motor is seated on a plate which is fitted with the interference suppression module which projects into the gear mechanism housing and, for its part, has to be designed in accordance with the structure and the orientation of the gear mechanism housing in each case individually. Such a design of the electric drive is complex, in particular with regard to the variety of tools required and the resultant tool costs.

The electric drive according to the invention has the advantage over the above that the variety of tools and the tool costs can be considerably reduced by using an identical assembly comprising a brush holder mount and an interference suppression module for different gear mechanism positions.

It is particularly expedient here when the retaining means on the interference suppression module and on the brush holder mount are designed as a groove and tongue connection because the interaction of such retaining means can be produced very reliably and at the same time easily, as a result of which the tool costs can be substantially reduced. In this case, identical tongue projections are preferably formed on opposite sides of a cutout in the brush holder mount and grooves, which are arranged with mirror-image symmetry to said cutout, are arranged on the interference suppression module because guide ribs which run on the brush holder mount can be easily integrally formed and then only associated groove-like notched areas have to be provided on the interference suppression module which is in the form of an insert part.

Two structurally identical interference suppression coils are preferably arranged within the interference suppression module at the same height and with mirror-image symmetry to one another, so that there is a further reduction in the variety of electrical components of the interference suppression module. Accordingly, one or more interference suppression capacitors can also be additionally accommodated on the interference suppression module.

BRIEF DESCRIPTION OF THE DRAWINGS

An exemplary embodiment of the invention is illustrated in the drawings and explained in greater detail in the following description, FIG. 2a shows a perspective exploded illustration of an electric drive with a gear mechanism annex which is oriented on the right of the motor shaft in the illustration.

DETAILED DESCRIPTION

Figure 1A:
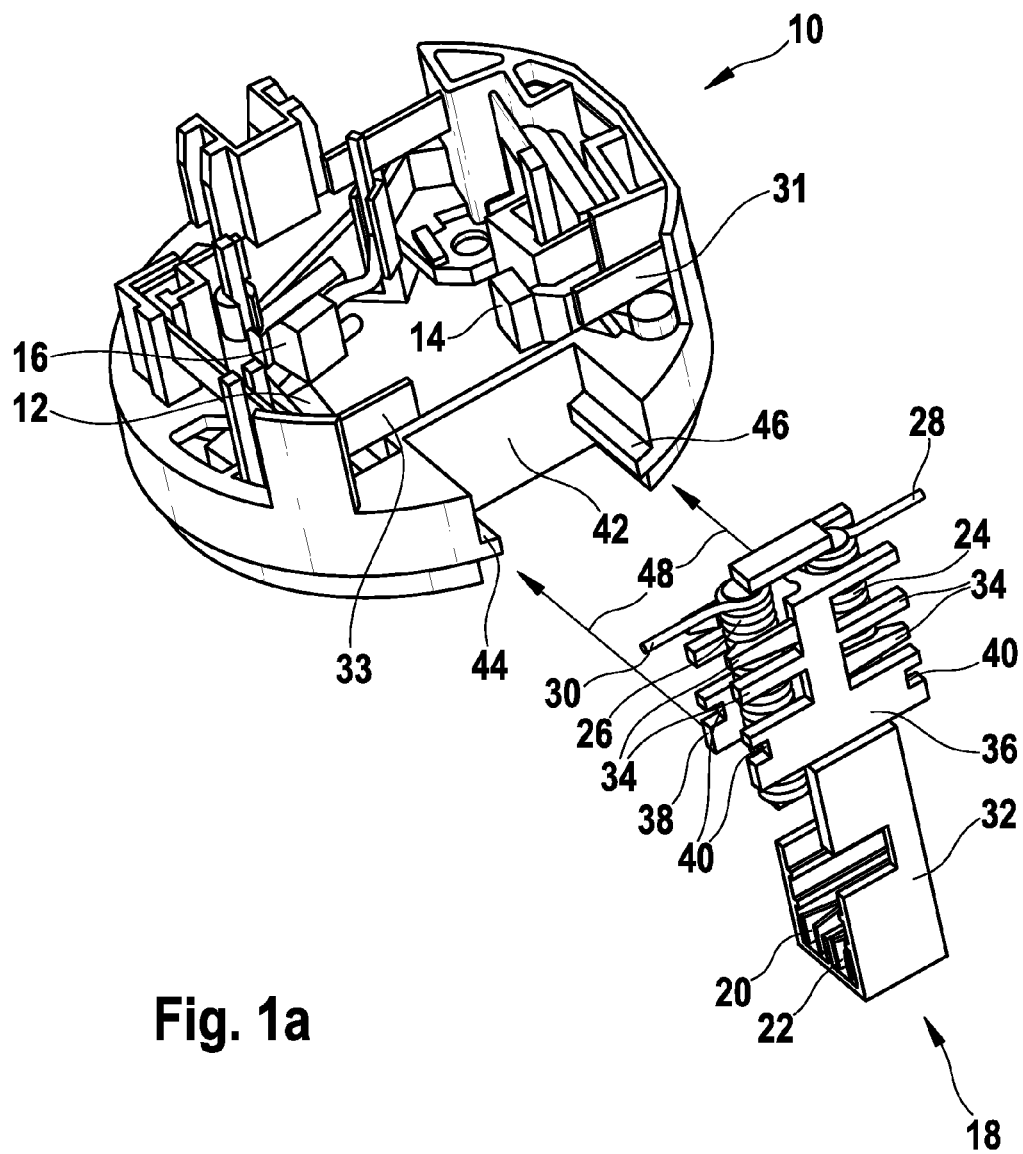
FIGS. 1a and 1b show perspective illustrations of a brush holder mount for an electric drive motor with two structurally identical interference suppression modules which can be mounted in various installation positions.
Figure 1B:
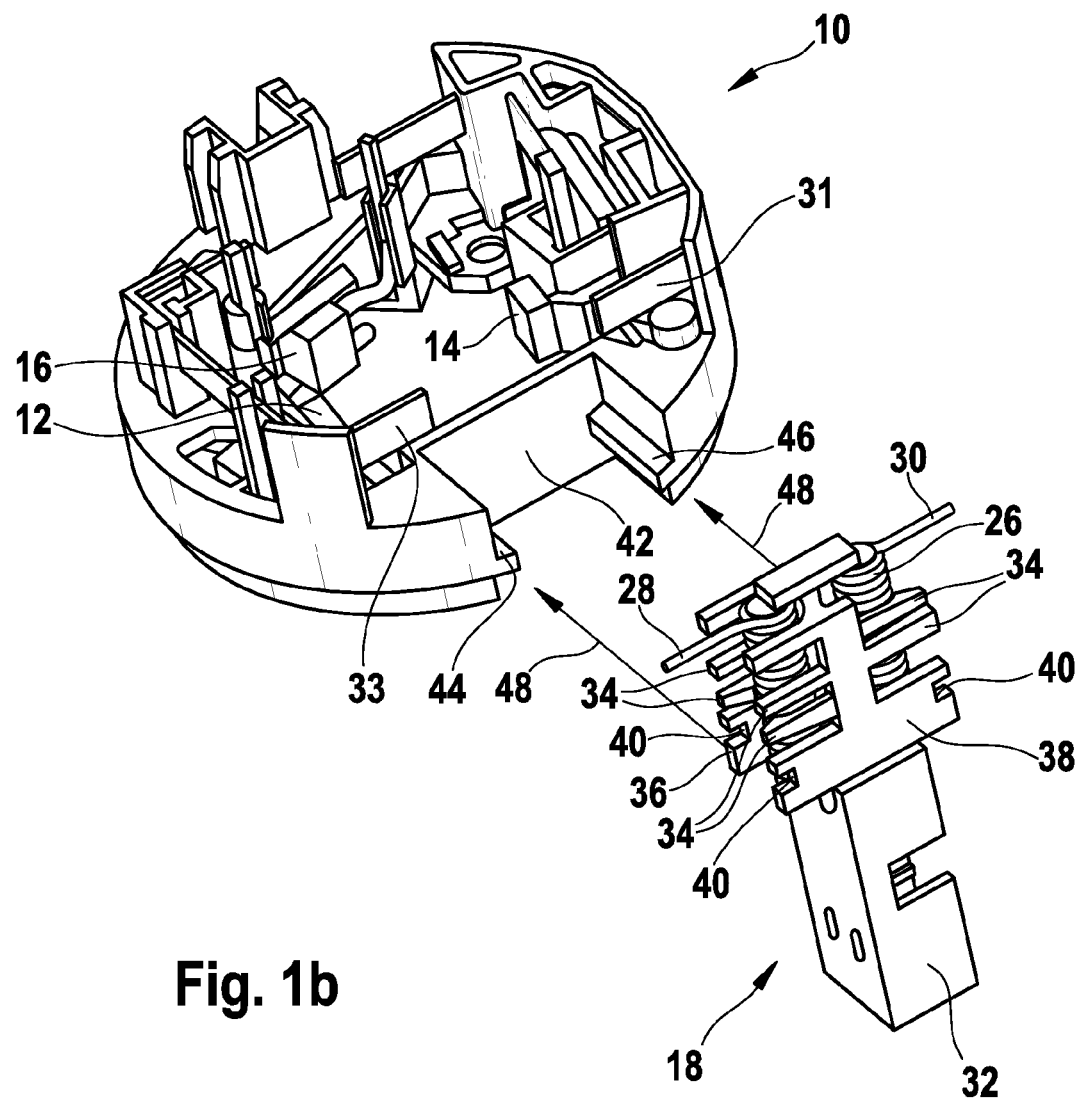

In FIGS. 1a and 1b, 10 denotes a brush holder mount for an electric drive motor of a windshield wiper system; the entire arrangement of the drive is explained in greater detail below with reference to FIGS. 2a and 2b.

Brushes 12, 14 and 16 are held in the brush holder mount, with the opposite brushes 12 and 14 feeding the motor at a relatively low rotational speed and the brushes 14 and 16 feeding the motor at a relatively high rotational speed. Two identical interference suppression modules 18, which are mechanically and electrically connected to the brush holder mount 10 for electrical connection and for radio interference suppression of the motor, are illustrated beneath the brush holder mount 10. For different gear mechanism positions of the electric drive, the structurally identical interference suppression module can, in this case, be mounted on the brush holder mount 10 in two installation positions which are rotated through 180°, so that the same interference suppression module with the same brush holder mount can be used for two different drives.

For electrical connection of the interference suppression module 18 to external electrical connections, said interference suppression module has clamp-like plug contacts 20 and 22 which, depending on the installation position, point in different directions in accordance with the respective gear mechanism position. In FIGS. 1a and 1b two identical interference suppression coils 24 and 26, offset by 180° in relation to one another, are inserted into the interference suppression module 18 as interference suppression elements, so that the wire ends 28 and 30 for connection of the coils point in opposite directions. The wire ends 28, 30 are connected to connection plates 31, 33 of the brush arrangement. In this case, the plug contacts 20, 22 and the interference suppression coils 24, 26 are arranged in an injection-molded plastic part 32 which serves as the housing of the interference suppression module 18, with the plug contacts 20 and 22 being inserted at the lower end of the injection-molded plastic part, while the interference suppression coils 24 and 26 are held in their respective position by finger-like projections 34.

In order to fix the interference suppression module 18 on or in the brush holder mount 10, the injection-molded plastic part has, on both sides of the interference suppression coils 24, 26 and so as to project from both sides, further projections 36 and 38 in which grooves 40 with the same position and size are made, said grooves forming the corresponding retaining means for the interference suppression module 18 on the brush holder mount 10 in conjunction with ribs 44 and 46, which are provided on the side of said brush holder mount as tongues, when inserted into a rectangular cutout 42 in the brush holder mount 10. The joining direction of the interference suppression module 18 is illustrated by arrows 48.

Figure 2B:
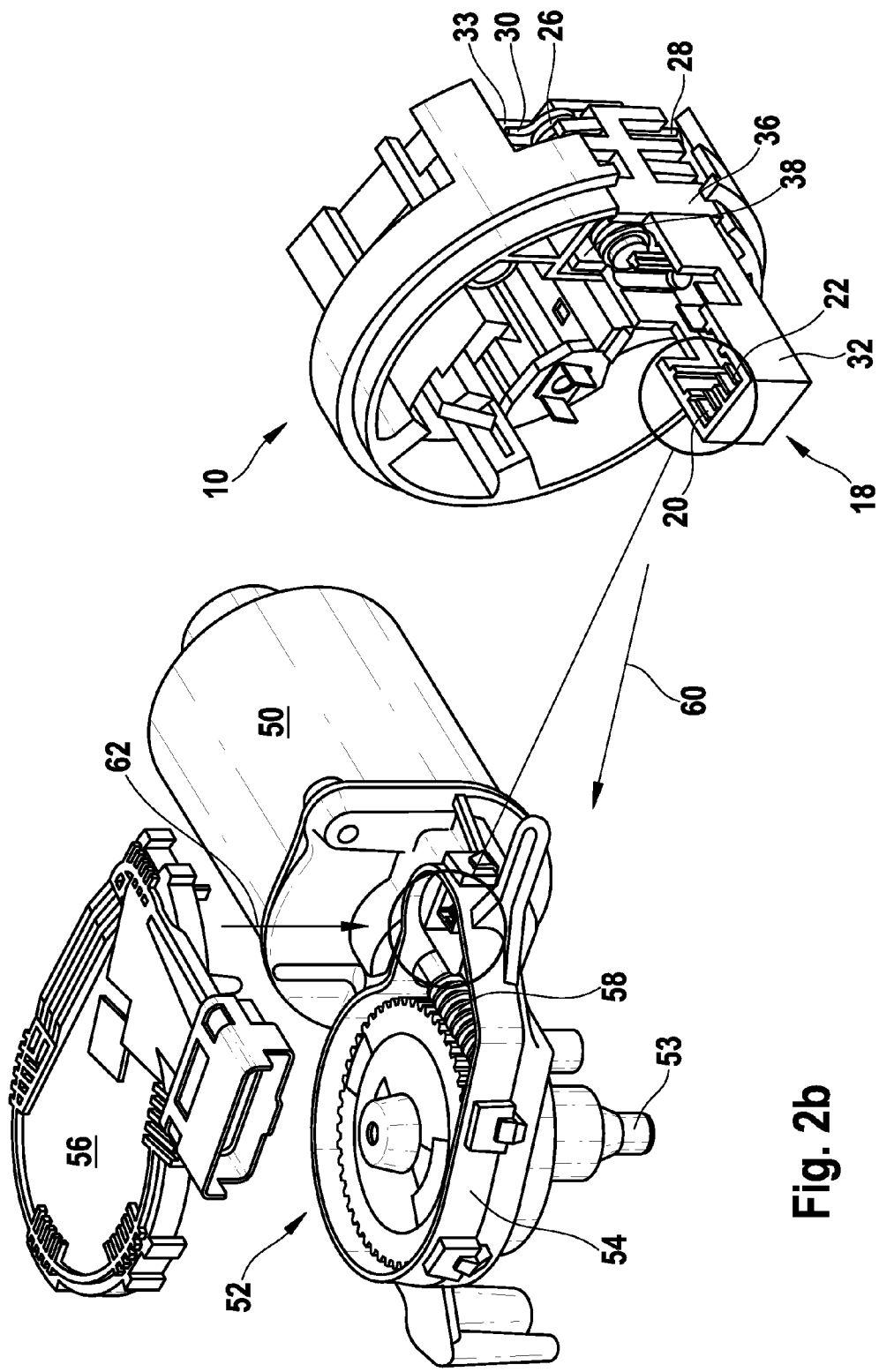
FIG. 2b shows a perspective exploded illustration of an electric drive with a gear mechanism annex which is oriented on the left of the motor shaft in the illustration.

FIGS. 2a and 2b shows perspective exploded illustrations of the assembly of the electric drive in two installation positions, which are rotated through 180° in relation to one another, of a gear mechanism 52 which is integrally formed on a motor housing 50, with identical parts being provided with identical reference symbols to those provided in FIG. 1.

FIGS. 2a and 2b clearly show the gear mechanism position of the electric drive rotated through 180°. In this case, the gear mechanism housing 54 with the output shaft 53 is oriented to the right with respect to the motor shaft 58 and the drive worm projecting out of the motor housing 50 in FIG. 2a and, in contrast, to the left in FIG. 2b. Such different gear mechanism positions are required, for example, in windshield wiper systems for vehicles for the windshield wipers on the right-hand side and the left-hand side of the vehicle, it being possible, according to the invention, to use the same assembly comprising a brush holder mount 10 and an interference suppression module 18 for both installation positions. It is only necessary for the gear mechanism 52 with the gear mechanism housing 54 and the gear mechanism cover 56 to be designed separately for the different installation positions.

The joining direction for the brush holder mount 10 and the gear mechanism cover 56 are indicated by arrows 60 and 62 in FIGS. 2*a* and 2*b*. In this case, the plug contacts 20 and 22 each point toward the open side of the gear mechanism housing 54 and contact can then be made with said plug contacts, by means of corresponding contacts on the gear mechanism cover 56, by external connections in order to supply power to the motor. The motorized part of the drive comprises identical components for both gear mechanism positions, the difference being only the mirror-image joining position of the interference suppression module 18 in the brush holder mount 10.

The invention claimed is:

1. An electric drive, having an electric motor in a motor housing (50), a brush holder mount (10) which projects into the motor housing (50), an interference suppression module (18), which is electrically and mechanically connected to the brush holder mount (10), for electrical connection and for radio interference suppression of the motor, and having a gear mechanism (52) which is mounted on the motor housing (50), partly accommodates the interference suppression module (18) and is designed in accordance with the predefined position of an output shaft (53) relative to the drive shaft (58) of the motor, characterized in that the interference suppression module (18) and the brush holder mount (10) are equipped with corresponding retaining means (40, 44) which allow a structurally identical interference suppression module (18) to be mounted on the brush holder mount (10) in two installation positions which are rotated through 180°.

2. The electric drive as claimed in claim 1, characterized in that the retaining means on the interference suppression module (18) and on the brush holder mount (10) are designed as a groove (40) and tongue (44) connection.

3. The electric drive as claimed in claim 2, characterized in that the retaining means have tongue projections (44) on the brush holder mount (10) and grooves (40), which are arranged with mirror-image symmetry, on the interference suppression module (18).

4. The electric drive as claimed in claim 3, characterized in that the brush holder mount (10) has a rectangular cutout (42) with tongue projections (44), which run with mirror-image symmetry and in parallel, on its side walls.

5. The electric drive as claimed in claim 4, characterized in that two structurally identical interference suppression coils (24, 26) are arranged with mirror-image symmetry next to one another in the interference suppression module (18).

6. The electric drive as claimed in claim 1, characterized in that the retaining means have tongue projections (44) on the brush holder mount (10) and grooves (40), which are arranged with mirror-image symmetry, on the interference suppression module (18).

7. The electric drive as claimed in claim 1, characterized in that the brush holder mount (10) has a rectangular cutout (42) with tongue projections (44), which run with mirror-image symmetry and in parallel, on its side walls.

8. The electric drive as claimed in claim 1, characterized in that two structurally identical interference suppression coils (24, 26) are arranged with mirror-image symmetry next to one another in the interference suppression module (18).

* * * * *